United States Patent [19]
Schroder

[11] 3,916,373
[45] Oct. 28, 1975

[54] ULTRASONIC TRANSMITTER FOR THE REMOTE CONTROL OF RADIO AND TELEVISION RECEIVERS

[75] Inventor: Wolfgang Schroder, Pforzheim, Germany

[73] Assignee: International Standard Electric Corporation, New York, N.Y.

[22] Filed: Oct. 24, 1974

[21] Appl. No.: 517,664

[30] Foreign Application Priority Data
Nov. 17, 1973 Germany............................ 2357499

[52] U.S. Cl................ 340/16 C; 331/128; 331/165; 331/166; 328/223; 340/12 SD; 72/71.5 VS
[51] Int. Cl.²........................................... G01S 3/80
[58] Field of Search............ 340/15, 16 C; 331/128, 331/165, 166; 328/223; 73/71.5 VS, 69; 315/411

[56] References Cited
UNITED STATES PATENTS
3,387,257  6/1968  Brech................................. 340/15

*Primary Examiner*—Maynard R. Wilbur
*Assistant Examiner*—T. M. Blum
*Attorney, Agent, or Firm*—John T. O'Halloran; Menotti J. Lombardi, Jr.; Peter Van Der Sluys

[57] ABSTRACT

A polarizing DC voltage is generated at the capacitance of an ultrasonic transducer and then short circuited by a parallelly arranged electronic switch controlled by the command signal frequency to be radiated. A direct current stored in an inductance during the shorting phase is supplied by way of a decoupling diode to the electrodes to the electrostatic transducer upon opening of the switch thereby generating a polarizing DC voltage for the transducer which is regenerated periodically. For achieving additional energy recuperation, a booster capacitor is disposed in series with the inductance and a booster diode is connected in parallel with the booster capacitor and a portion of the inductance.

4 Claims, 1 Drawing Figure

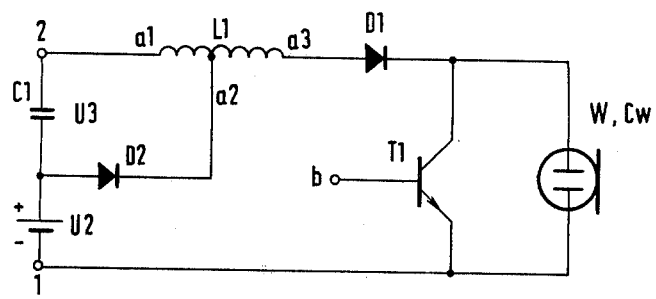

ULTRASONIC TRANSMITTER FOR THE REMOTE CONTROL OF RADIO AND TELEVISION RECEIVERS

BACKGROUND OF THE INVENTION

1. Field of the Invention

The present invention relates to an ultrasonic transmitter employing an electrostatic ultrasonic transducer for remotely controlling radio and television receivers and more particularly to such a device having energy recuperation means.

2. Description of the Prior Art

Applicant's copending application Ser. No. 474,455 teaches an ultrasonic transmitter employing an electrostatic ultrasonic transducer for the remote control of radio and television receivers, and is characterized by the fact that both a controllable electronic switch and a source of d.c. voltage are arranged in parallel with the electrodes of the electrostatic transducer. In this device there is provided a non-reactive and wide-band supply for an electrostatic ultrasonic transducer for remote-control purposes. There is also generated a polarizing d.c. voltage at the capacitance of the ultrasonic transducer. A periodic short-circuiting of the d.c. voltage is achieved with the aid of a controlled electronic switch arranged in parallel therewith, with the switch being controlled by the frequency to be radiated. During the short-circuit phase, the current is simultaneously stored in an inductance which, upon opening of the switch, induces a voltage which, via a decoupling diode, is supplied to the electrodes of the ultrasonic transducer. During the likewise periodically appearing opening phase of the switch, the polarizing potential is thus newly produced in each period.

From the relationships derived in the copending application, the following will result with respect to the polarizing potential $U_{max}$ as a function of the peak power $N_{max}$ $$U_{max} = \sqrt{\frac{N_{max}}{2fC_w}}$$

in the case of a switching frequency $f$ at the capacitance $C_w$ of the ultrasonic transducer. In the case of a complete dissipation of energy the medium continuous power to be afforded would amount to one quarter of the peak power. The energy as stored in the transducer capacitance is negligibly small, and a regaining is not worth-while. With respect to the energy stored in the coil, however, a regaining of the following kind is already achieved by the circuit according to the copending patent application:

Although capacitive influences are negligible when the electronic switch is closed, there will occur an oscillation between the inductive and the capacitive energy during the blocking phase. How much of this energy will be resupplied upon closing the electronic switch, depends on 1. the natural oscillation of the coil and its connected capacitances,
2. the duration and the duty cycle of the switching period,
3. the losses.

The amount of stored and oscillating energy still remaining at the end of the blocking phase of a period, is either resupplied to the battery with corresponding losses, upon reclosing the electronic switch, or used as well in the coil for re-establishing the magnetic field, in accordance with the aforementioned requirements.

The inductively produced polarization potential $U_{max}$, therefore, besides its continuous dependence upon the power supply, frequency, inductance and capacitance, still has a superimposed periodic dependence, with the maxima thereof appearing whenever an odd number of semicycles of the natural oscillations falls within the blocking phase. In the case of an odd number of semicycles during the blocking phase, current is first of all resupplied to the battery at the beginning of the switching phase, the current rise in the coil is delayed, and $U_{max}$ shows its minima under these conditions at smaller current input.

SUMMARY OF THE INVENTION

It is the object of the invention to provide a non-reactive wide-band supply of an electrostatic ultrasonic transducer for remote-control purposes featuring a minimum current consumption.

In the way of regaining energy according to the invention, with the aid of a booster diode of the type of a "booster circuit" as is known in particular for the horizontal (line) deflection circuit of tube-type television receivers, the following advantages will result over the first-mentioned basic circuit:

1. The natural resonance of the system during the blocking phase is extensively without influence upon the kind of energy transmission, because the booster diode immediately suppresses the oscillation of the energy, for storing it as a charge in the booster capacitor. There will no longer occur the previously observed maxima and minima.
2. The decoupling diode in front of the ultrasonic transducer only needs to be designed (dimensioned) with respect to the amplitude of the polarizing d.c. voltage.
3. Owing to the quicker regaining, the energy has less time to go astray, and the efficiency is higher.
4. In spite of a lower battery current consumption there will result a greater range of the ultrasonic connection.
5. The obtained booster voltage can be used for supplying other parts of the circuit.

BRIEF DESCRIPTION OF THE DRAWING

The drawing is a schematic of the present invention.

DESCRIPTION OF THE PREFERRED EMBODIMENT

Referring to the drawing, a current flows from the plus pole of the battery U2 via a tapping point $a2$ of a coil L1, via a decoupling diode D1, and a transistor or thyristor T1 to the minus pole of the battery, as soon as the base $b$ of T1 receives switching current from a control generator at the ultrasonic frequency to be radiated. As a control generator there may be used, for example, a conventional type of switchable frequency divider circuit, which is supplied from a crystal-controlled generator.

During the first switch-on phase, only one partial winding $a2 - a3$ of the coil L1 will store energy which, during the subsequently following blocking phase, will remain to be stored to a smaller extent as a polarization potential on the capacitance Cw of the ultrasonic transducer W, until being dissipated by the next switch-on phase. The resonant voltage as appearing during the blocking phase at the coil L1 and its capacitances, is rectified in one polarity direction by the booster diode D2, and stored as a booster voltage in the booster capacitor C1. With respect to the further switching phases, both the battery voltage U2 and the booster voltage U3 in series at the terminals 1 and 2, will serve as the supply voltage of the circuit. In the course of this, its function is as already explained, only with the difference that the current of the switch-on phase does no longer flow via $a2$, but via $a1 \ldots a3$ through the entire coil.

The capacitance value of the booster capacitor C1 is chosen sufficiently large for the purpose of avoiding a voltage-reducing ripple on the booster d.c. voltage.

To the terminals 1 and 2 it is possible to connect circuit parts or modules requiring a supply voltage which is higher than the battery voltage. If, from this, there is supplied e.g. the module serving to generate the switching pulses, care must be taken that it already during the transient phase, supplies sufficient switching currents to the base of T1.

A further advantage of the ultrasonic transmitter comprising a booster circuit according to the invention is to be seen in the control with frequency-modulated signals of great shift which is possible owing to the frequency independence. It is therefore suitable for being used in a particularly advantageous manner for establishing ultrasonic connections between master and secondary (slave) sets.

What is claimed is:

1. An ultrasonic transmitter, comprising:

an electrostatic ultrasonic transducer for remotely controlling radio and television receivers;

a controllable electronic switch connected in parallel with the electrostatic transducer;

a source of d.c. voltage connected in series with the parallelly connected transducer and electronic switch;

a diode connected in series with the d.c. voltage source and being polarized in the same direction as the d.c. voltage source to allow the flow of d.c. current;

a booster capacitor connected in series with the d.c. voltage source;

a coil connected in series with the capacitor and having an end connected to a first plate of said capacitor, said coil having a tap disposed between its ends; and a booster diode connected between the tap of the coil and the second plate of the capacitor, said diode polarized in a direction to allow current from the d.c. voltage source to flow and bypass the booster capacitor and a portion of the coil.

2. An ultrasonic transmitter as described in claim 1, wherein the d.c. voltage source comprises a battery.

3. An ultrasonic transmitter as described in claim 1, wherein the controllable electronic switch comprises a switching transistor.

4. An ultrasonic transmitter as described in claim 1, wherein the electronic switch is operated at the frequency of an ultrasonic signal to be radiated.

* * * * *